US010213048B2

(12) United States Patent
Lee et al.

(10) Patent No.: US 10,213,048 B2
(45) Date of Patent: Feb. 26, 2019

(54) HEAT-RETAINING TRAY

(71) Applicants: MORU CO., LTD., Jeju-si, Jeju-do (KR); JEJU NATIONAL UNIVERSITY INDUSTRY-ACADEMIC COOPERATION FOUNDATION, Jeju-si, Jeju-do (KR)

(72) Inventors: Ho Won Lee, Jeju-si (KR); Seung Geon Kim, Jeju-si (KR); Kyung Ho Cho, Jeju-si (KR); Kyung Mo Im, Jeju-si (KR)

(73) Assignees: Moru Co., Ltd. (KR); Jeju National University Industry-Academic Cooperation Foundation (KR)

( * ) Notice: Subject to any disclaimer, the term of this patent is extended or adjusted under 35 U.S.C. 154(b) by 91 days.

(21) Appl. No.: 15/304,499

(22) PCT Filed: Jul. 21, 2015

(86) PCT No.: PCT/KR2015/007566
§ 371 (c)(1),
(2) Date: Oct. 14, 2016

(87) PCT Pub. No.: WO2016/017981
PCT Pub. Date: Feb. 4, 2016

(65) Prior Publication Data
US 2017/0035243 A1 Feb. 9, 2017

(30) Foreign Application Priority Data

Jul. 28, 2014 (KR) .................. 10-2014-0095747
Sep. 19, 2014 (KR) .................. 10-2014-0124918
Sep. 19, 2014 (KR) .................. 10-2014-0124919

(51) Int. Cl.
*A47J 36/24* (2006.01)
*A47G 19/02* (2006.01)
(Continued)

(52) U.S. Cl.
CPC .......... *A47J 36/2483* (2013.01); *A47G 19/02* (2013.01); *A47G 19/027* (2013.01); *A47G 23/04* (2013.01); *A47J 41/00* (2013.01); *F24C 15/166* (2013.01)

(58) Field of Classification Search
None
See application file for complete search history.

(56) References Cited

U.S. PATENT DOCUMENTS 2,890,318 A * 6/1959 Kruse ................. H05B 3/50
164/98
3,664,256 A * 5/1972 Peirce ................. A47J 37/0676
99/425
(Continued)

FOREIGN PATENT DOCUMENTS

JP 3066460 U 12/1999
JP 2006-218143 A 8/2006
(Continued)

OTHER PUBLICATIONS

Partial English translation of relevant parts of JP 3066460 U dated Dec. 1, 1999, listed above (1 page).
(Continued)

*Primary Examiner* — Ibrahime A Abraham
*Assistant Examiner* — Gyounghyun Bae
(74) *Attorney, Agent, or Firm* — Lewis Roca Rothgerber Christie LLP

(57) ABSTRACT

The present invention relates to a heat-retaining tray for a pizza, comprising one of a support means and an electricity supply means. The present invention provides a heat-retain-
(Continued)

ing tray comprising: an upper plate having a plurality of protrusions formed such that food is laid on the upper surface of the plurality of protrusions; a side wall integrally formed vertically on the periphery of the upper plate; and a temperature increase unit for raising the temperature of the upper plate.

15 Claims, 13 Drawing Sheets

(51) Int. Cl.
*A47J 41/00* (2006.01)
*A47G 23/04* (2006.01)
*F24C 15/16* (2006.01)

(56) References Cited

U.S. PATENT DOCUMENTS

| | | | | |
|---|---|---|---|---|
| 3,848,110 | A * | 11/1974 | Giguere | A47J 37/0611 219/386 |
| D246,627 | S * | 12/1977 | Sugiyama | 99/400 |
| 4,121,510 | A * | 10/1978 | Frederick | A47J 36/04 219/733 |
| 4,373,636 | A | 2/1983 | Hoffman | |
| 4,378,729 | A * | 4/1983 | Pierick | A21B 1/26 126/275 R |
| 4,384,513 | A * | 5/1983 | Pierick | A21B 1/26 126/275 R |
| 4,436,023 | A * | 3/1984 | Takahashi | A47J 36/38 126/299 D |
| 4,446,776 | A * | 5/1984 | Gelfman | A47J 37/10 99/401 |
| 4,867,050 | A * | 9/1989 | Patenaude | A47J 37/0754 99/400 |
| D348,220 | S * | 6/1994 | Herzog | D9/428 |
| 5,365,833 | A * | 11/1994 | Chen | A47J 37/01 126/273 R |
| 5,420,393 | A * | 5/1995 | Dornbush | A23L 3/40 219/386 |
| 5,484,984 | A * | 1/1996 | Gics | B65D 81/3453 219/730 |
| 5,943,949 | A * | 8/1999 | Sham | A47J 37/067 126/369.1 |
| 5,967,135 | A * | 10/1999 | Shariat | A47J 37/0754 126/21 A |
| 6,169,270 | B1 * | 1/2001 | Check | A45C 11/20 219/387 |
| 6,187,359 | B1 * | 2/2001 | Zuccarini | A47J 37/01 126/25 R |
| D440,490 | S * | 4/2001 | Lizzio | D9/428 |
| 6,403,932 | B1 * | 6/2002 | Nelson | H05B 3/746 219/448.11 |
| 6,487,964 | B2 * | 12/2002 | Snoke | A47J 37/01 99/345 |
| 8,084,719 | B2 * | 12/2011 | Ciancimino | A47J 37/0676 219/450.1 |
| 8,181,640 | B2 * | 5/2012 | Park | A47J 27/00 126/220 |
| 2005/0077283 | A1 * | 4/2005 | Sawhney | A47J 37/105 219/438 |
| 2008/0135541 | A1 * | 6/2008 | Peng | H05B 3/683 219/438 |
| 2013/0298781 | A1 * | 11/2013 | Ganuza | A47J 37/0623 99/447 |
| 2014/0091096 | A1 | 4/2014 | Cozadd | |

FOREIGN PATENT DOCUMENTS

| | | |
|---|---|---|
| JP | 2009-039377 A | 2/2009 |
| KR | 2000-0006601 U | 4/2000 |
| KR | 10-2011-0015351 A | 2/2011 |
| KR | 10-2011-0080059 A | 7/2011 |
| KR | 10-2013-0072380 A | 7/2013 |
| KR | 10-1365337 B1 | 2/2014 |

OTHER PUBLICATIONS

Abstract and English machine translation of Korean Publication 2000-0006601 U dated Apr. 25, 2000, listed above (9 pages).
PCT International Search Report dated Nov. 6, 2015, for corresponding International Patent application PCT/KR2015/007566 (4 pages).

* cited by examiner

[Fig. 1]
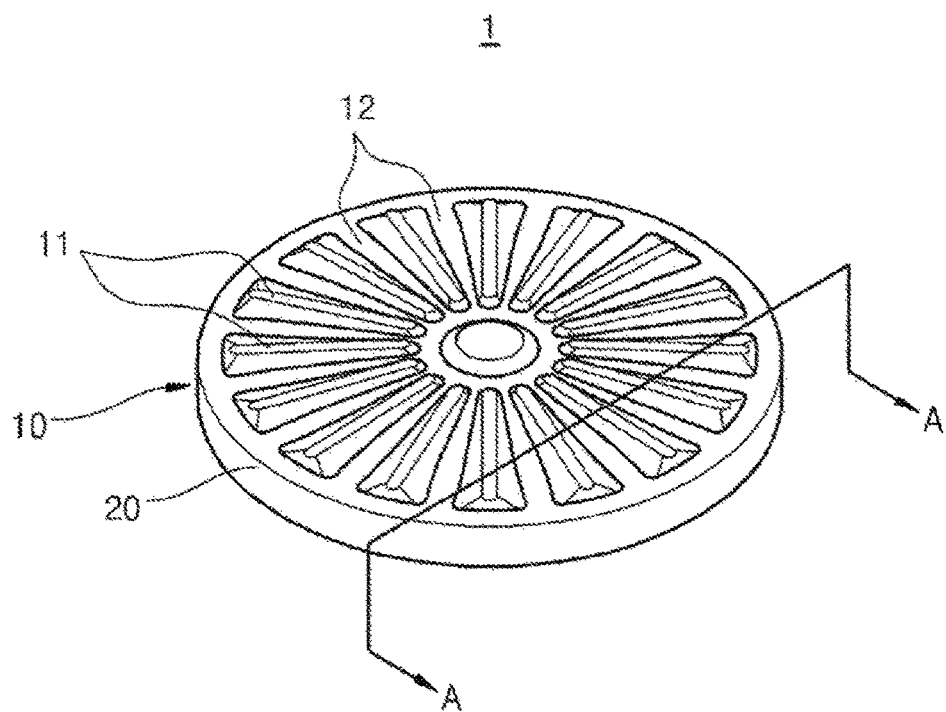

[Fig. 2]
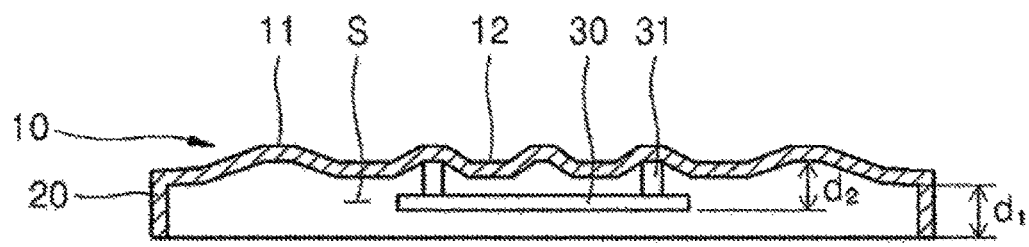
(A)
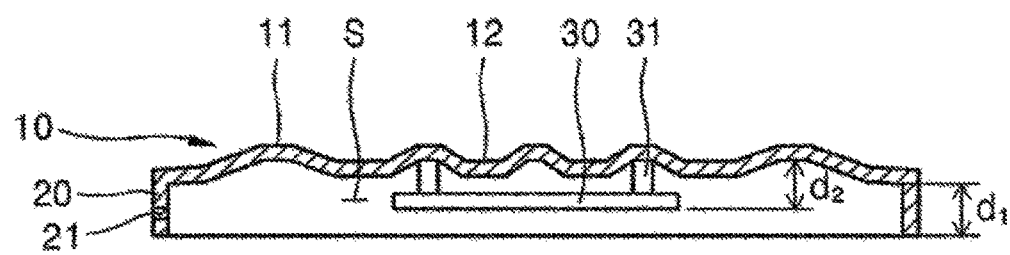
(B)

[Fig. 3]
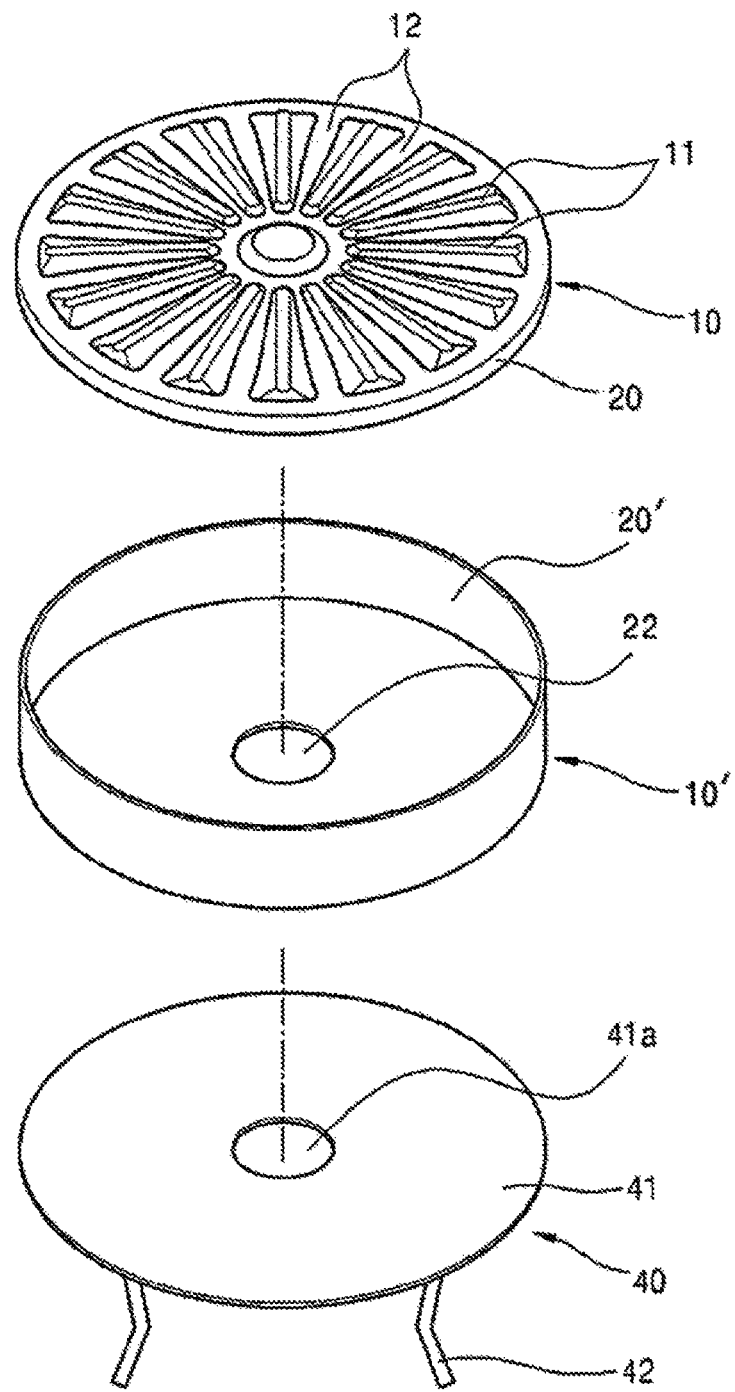

[Fig. 4]
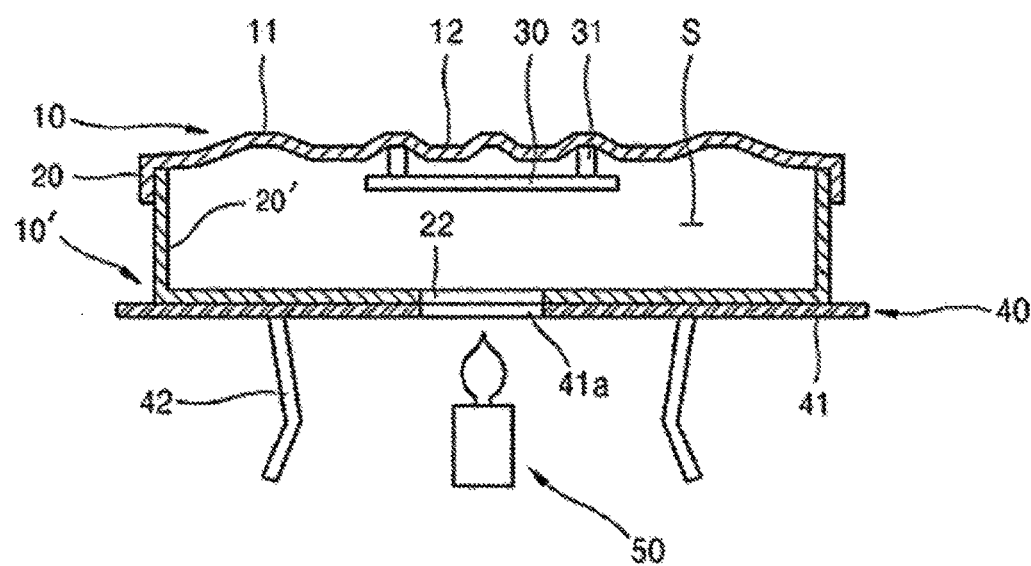

[Fig. 5]
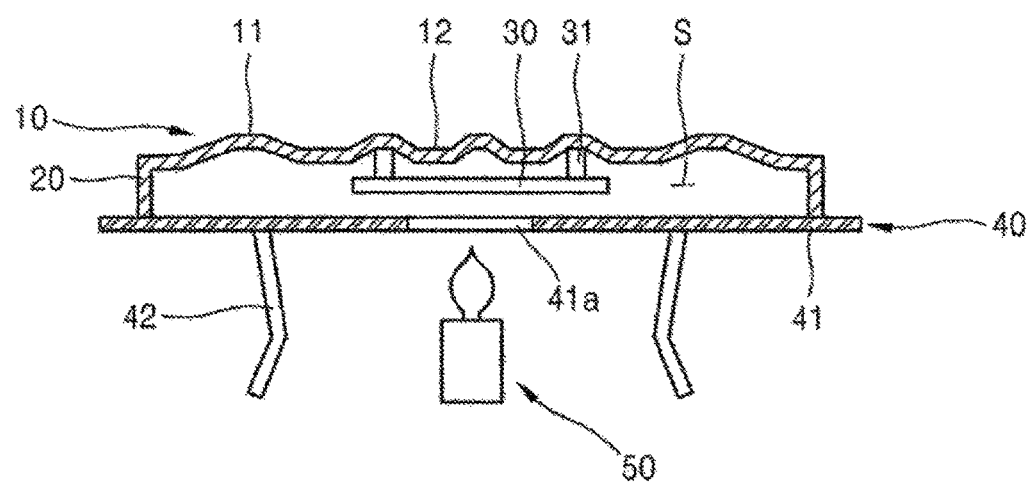

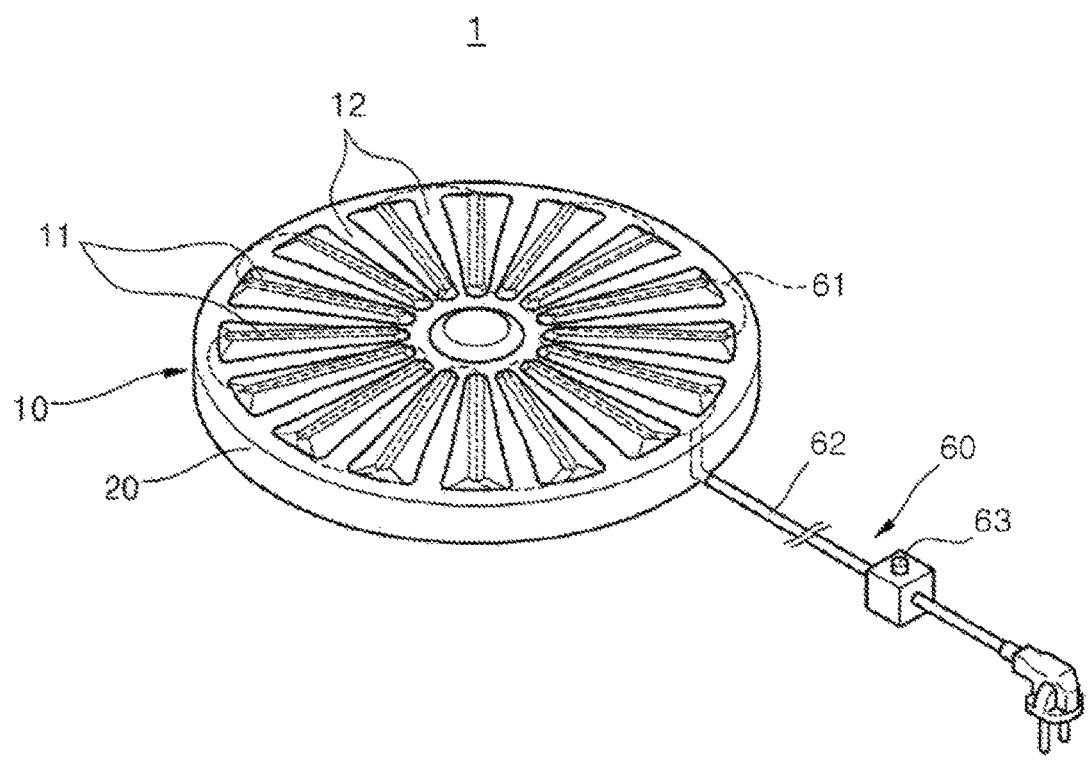
[Fig. 6]

[Fig. 7]
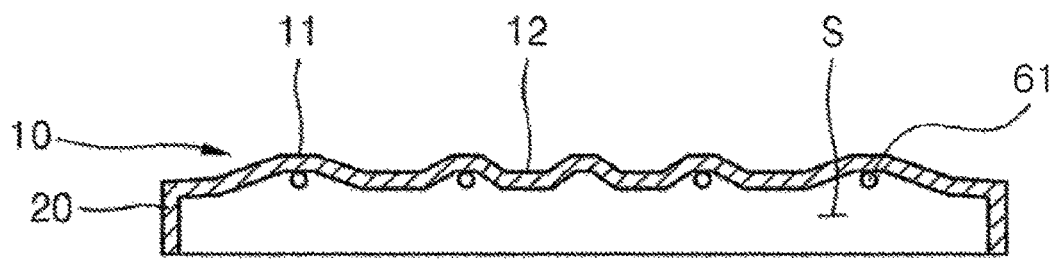

[Fig. 8]
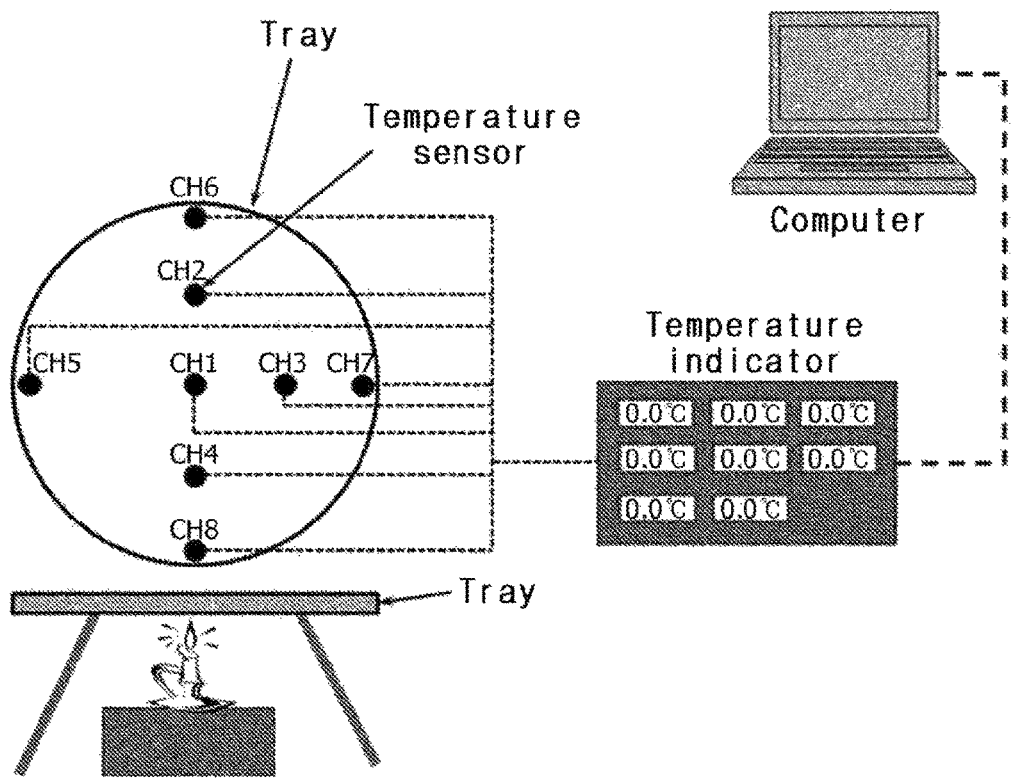

[Fig. 9]
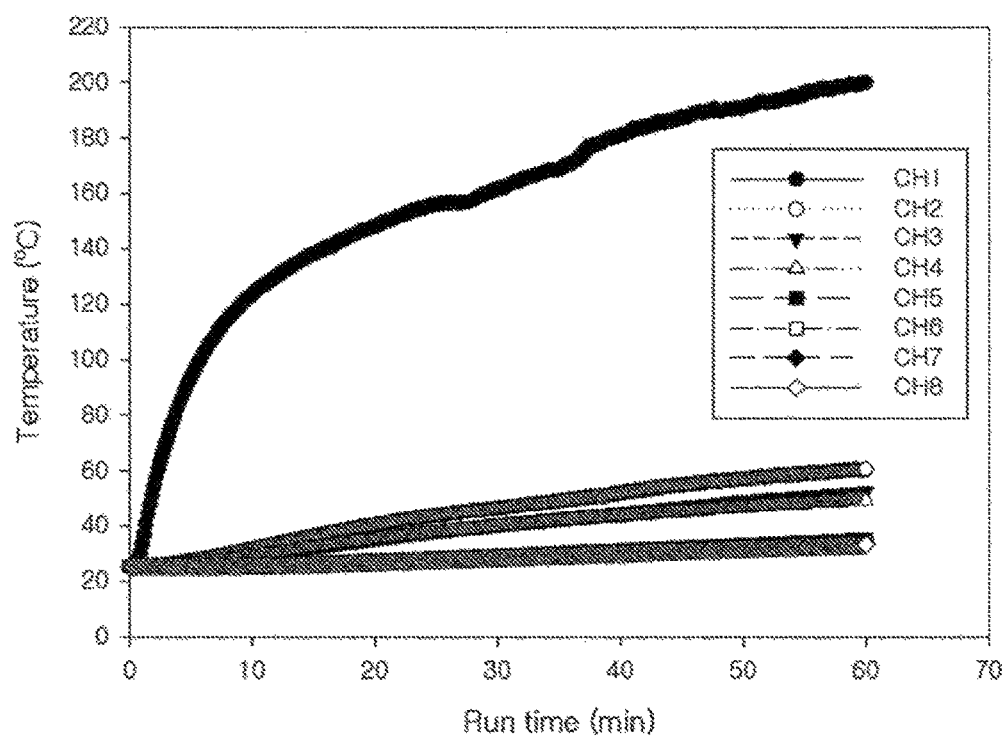

[Fig. 10]
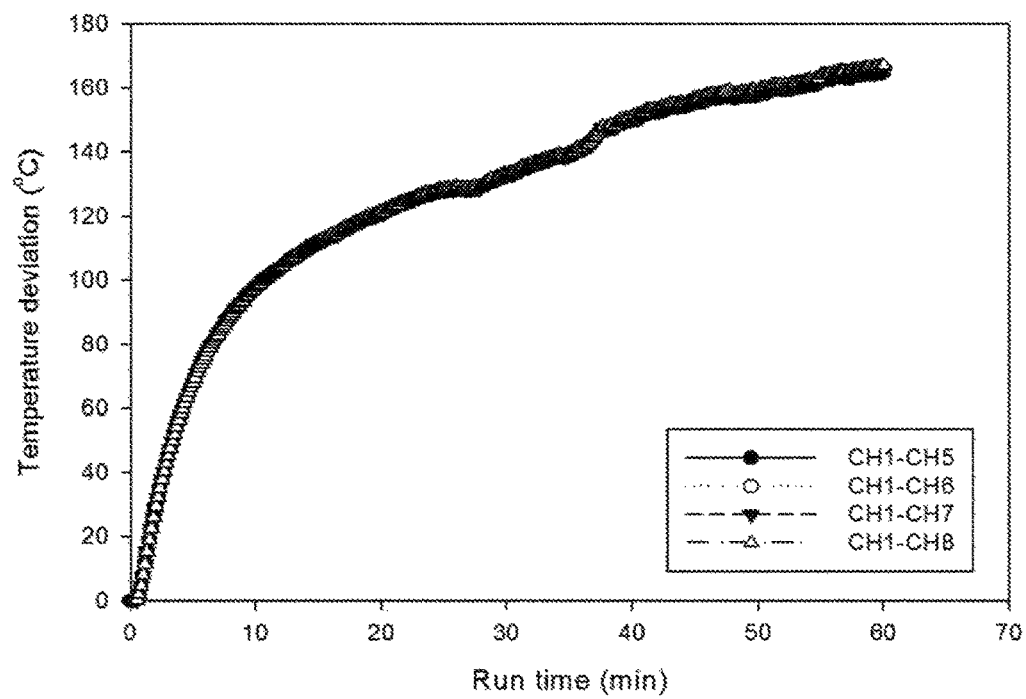

[Fig. 11]
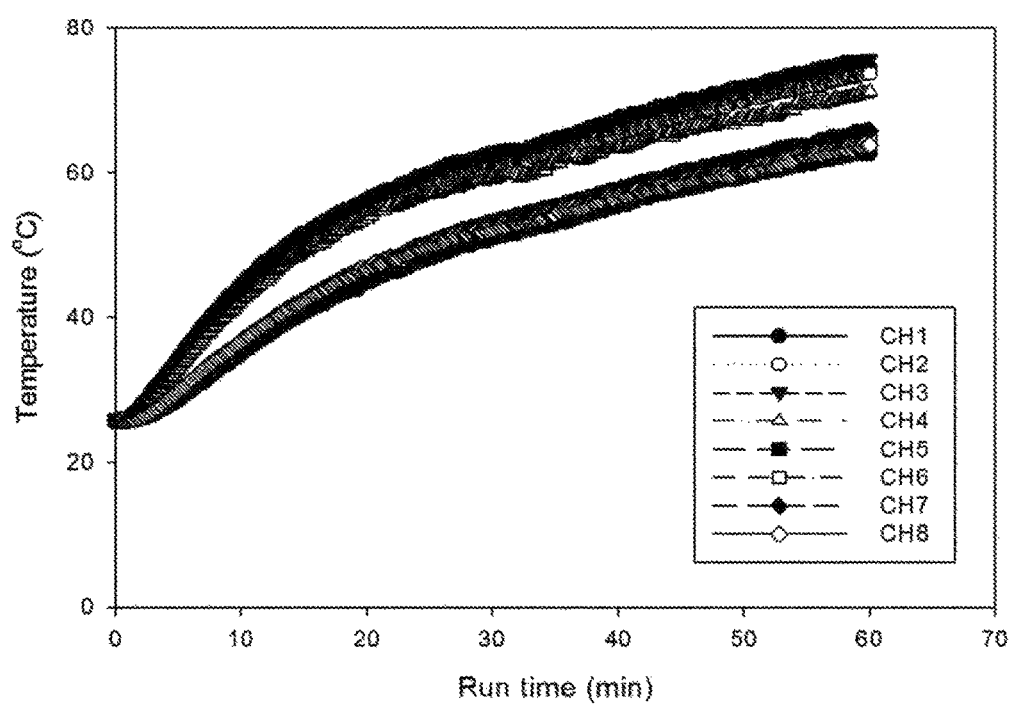

[Fig. 12]
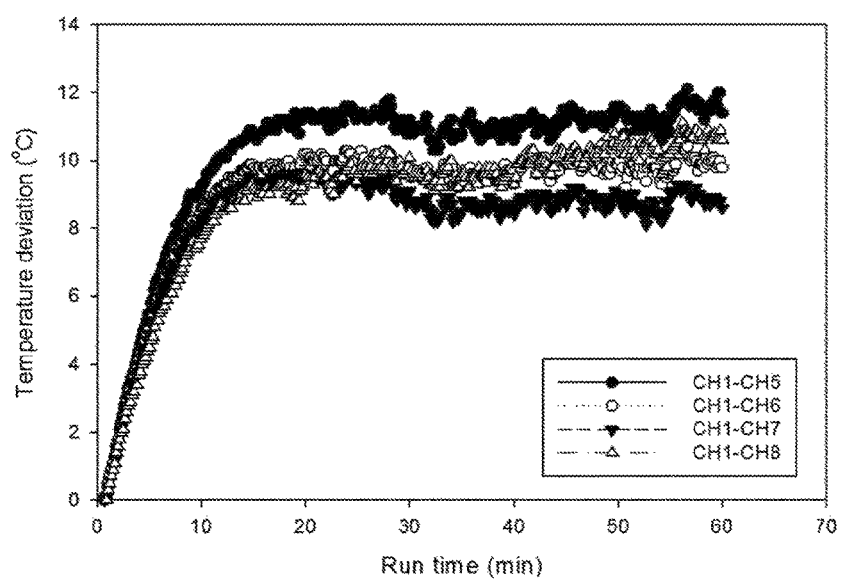

[Fig. 13]
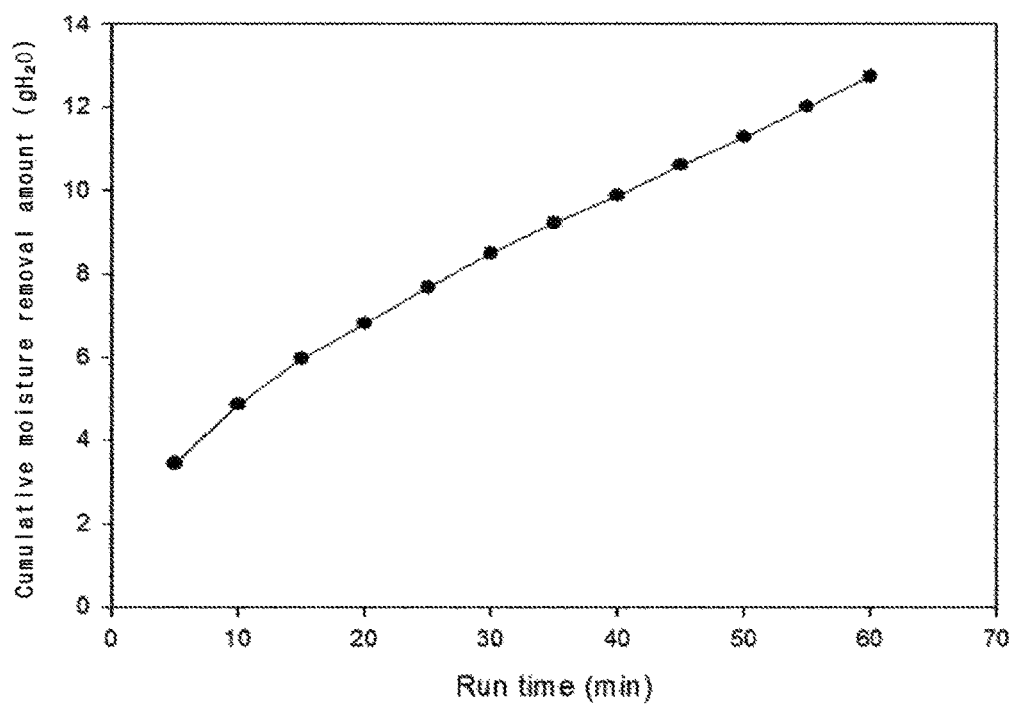

HEAT-RETAINING TRAY

CROSS-REFERENCED TO RELATED APPLICATION(S)

This Application is a National Phase Patent Application and claims priority to and the benefit of International Application No. PCT/KR2015/007566, filed Jul. 21, 2015, which claims priority to and benefit to Korean Application 10-2014-0124919, filed Sep. 19, 2014, Korean Application 10-2014-0124918, filed Sep. 19, 2014, and Korean Application 10-2014-0095747, filed Jul. 28, 2014, the entire contents of all of which are incorporated herein by reference.

TECHNICAL FIELD

The present invention relates to a heat-retaining tray for food including dough made through kneading, and more particularly, to a heat-retaining tray which can remove humidity and maintain a warm temperature for long hours so as to prevent moisture in food such as pizza, waffle, honey bread, and the like from being collected on the bottom thereof.

BACKGROUND ART

Pizza which may be said to be traditional Italian food was first introduced in the year of 1905 at a pizza store of an Italian neighborhood in New York City, and was settled as food for the public with the progression of industrialization after the Second World War.

Even in Korea, since the advance of foreign pizza companies after '88 Olympics, pizza has become a general menu which men and women of all ages enjoy.

In recent years, in addition to oven-baked pizza, stove pizza which is crisply baked quickly by comprehensively using conduction heat, radiant heat, and convective heat, has attracted popularity and settled as a new food service culture. In particular, the stove pizza is loved as wellbeing and slow food by modern people who consider calories, taste, nutrition, and health.

All food can possess a unique taste and flavor according to characteristics of the food material and recipe, and the way that it is eaten and atmosphere exert a large influence on development of food culture.

For example, pleasure of eating pizza may be doubled through changes in chemical taste and physical texture according to the mixture of food materials, degree of maturation of the dough, or heat treatment method and the like, as well as changes in visual shape.

Famous pizza companies primarily make large-sized pizza by using the oven and show new pizza products by varying various topping materials, while a pizzeria has varied the pizza products by reducing pizza dough size, decreasing thickness, and by using a stove, increasing crispness and reducing grease.

Eating pizza baked in the oven or stove while it is still hot can save the taste and flavor and the texture of the pizza can be strongly felt. However, there is a problem of moisture forming under the pizza where it is in contact with the plate surface, as the temperature of baked pizza quickly drops at room temperature.

That is, although a lot of moisture contained in the pizza itself helps in cooking dough or topping materials while the pizza is being baked and serves to maintain the chewiness of the pizza, when the moisture is concentrated on a surface of the pizza, crispness of the pizza is interfered and thus the texture is deteriorated.

In order to quickly remove the moisture on the surface of the pizza and maintain the crispness, pizza baked in the stove with thin dough is presented as an alternative. However, when the stove pizza is provided to customers, the pizza is placed on a pizza plate and thus moisture easily forms underneath the pizza, and as a result, the problem of moisture gathering on the pizza plate is not solved.

DISCLOSURE

Technical Problem

The present invention provides an integrated heat-retaining tray capable of solving a problem of food becoming soggy and losing its crispness due to moisture from the inside of hot pizza, waffle, honey bread, and the like when the cooked pizza, waffle, honey bread, and the like are provided to customers.

Further, the present invention provides an integrated heat-retaining tray capable of giving the best texture by easily removing moisture on the surface of the dough included in the food while the temperature of the food provided to the customers is maintained for long hours.

Technical Solution

The present invention relates to a heat-retaining tray, and provides a heat-retaining tray comprising: an upper plate having a plurality of protrusions formed such that food is laid on the upper surface of the plurality of protrusions; a side wall integrally formed vertically on the periphery of the upper plate; and a temperature increase unit for raising the temperature of the upper plate.

Advantageous Effects

According to the present invention, it is possible to solve a problem of food becoming soggy and losing its crispness due to moisture from the inside of hot foods when cooked pizza, waffle, honey bread, and the like are provided to customers, and thereby easily removing moisture on the surface of the food while the temperature of the food is maintained for long hours, giving the best texture.

DESCRIPTION OF DRAWINGS

FIG. 1 is a perspective view illustrating an upper plate and a side wall of a heat-retaining tray according to an exemplary embodiment of the present invention.

FIG. 2 is a cross-sectional view illustrating the upper plate and the side wall of the heat-retaining tray according to an exemplary embodiment of the present invention.

FIG. 3 is an exploded perspective view illustrating the heat-retaining tray including a lower plate and a second side wall according to an exemplary embodiment of the present invention.

FIG. 4 is a state of use diagram illustrating the heat-retaining tray including the lower plate and the second side wall according to an exemplary embodiment of the present invention.

FIG. 5 is a state of use diagram illustrating the heat-retaining tray including a support means of a temperature increase unit according to an exemplary embodiment of the present invention.

FIG. 6 is a state of use diagram illustrating the heat-retaining tray including an electricity supply means of the temperature increase unit according to an exemplary embodiment of the present invention.

FIG. 7 is a cross-sectional view illustrating the heat-retaining tray including the electricity supply means of the temperature increase unit according to an exemplary embodiment of the present invention.

FIG. 8 is a schematic diagram illustrating a test apparatus for measuring a temperature distribution of a tray for Examples.

FIG. 9 is a graph illustrating a result of measuring a temperature distribution in a ceramic tray in the related art, which is obtained in Example 1.

FIG. 10 is a graph illustrating an average temperature deviation between a center and an edge of the ceramic tray in the related art, which is obtained in Example 1.

FIG. 11 is a graph illustrating a result of measuring a temperature distribution in a heat-retaining tray according to an exemplary embodiment of the present invention, which is obtained in Example 2.

FIG. 12 is a graph illustrating an average temperature deviation between a center and an edge of the heat-retaining tray according to an exemplary embodiment of the present invention, which is obtained in Example 2.

FIG. 13 is a graph illustrating a cumulative moisture removal amount of the heat-retaining tray according to an exemplary embodiment of the present invention, which is obtained in Example 3.

BEST MODE

The present invention relates to a heat-retaining tray, and provides a heat-retaining tray comprising: an upper plate having a plurality of protrusions formed such that food is laid on the upper surface of the plurality of protrusions; a side wall integrally formed vertically on the periphery of the upper plate; and a temperature increase unit for raising the temperature of the upper plate.

Further, the respective protrusions may be formed from the center of the upper plate in a radial form.

Further, a lower plate and a second side wall integrally formed vertically on the periphery of the lower plate may be further included below the upper plate and the side wall.

Further, a drain opening may be further included in the side wall.

Further, the temperature increase unit may include at least one of a support means and an electricity supply means.

Further, the support means may include a seating platform on which the side wall is seated and in which a through-hole is formed and a plurality of support legs which are connected to the lower portion of the seating platform.

Further, a heat diffusion plate may be provided below the upper plate at a position corresponding to the through-hole.

Further, the heat diffusion plate may be spaced apart from and connected to the lower portion of the upper plate by a spacer.

Further, a distance between the upper plate and the heat diffusion plate may be formed to be smaller than a height of the side wall.

Further, the electricity supply means may include a heat wire disposed on the lower surface of the upper plate and an electricity supply wire supplying the electricity to the heat wire.

Further, the heat wire may be disposed in a zigzag form to correspond to each protrusion.

Further, the electricity supply means may further include a temperature controller capable of controlling the temperature of the heat wire.

Further, the moisture of the food may be removed by a plurality of valleys which are flow passages of the moisture formed between the plurality of protrusions.

Hereinafter, preferable exemplary embodiments of the present invention will be described in detail with reference to the accompanying drawings. Terms or words used in the present specification and claims, which will be described below should not be interpreted as being limited to typical or dictionary meanings, but should be interpreted as having meanings and concepts which comply with the technical spirit of the present invention, based on the principle that an inventor can appropriately define the concept of the term to describe his/her own invention in the best manner.

Therefore, configurations illustrated in the embodiments and the drawings described in the present specification are only the most preferred embodiment of the present invention and do not represent all of the technical spirit of the present invention, and thus it is to be understood that various modified examples, which may replace the configurations, are possible when filing the present application.

FIG. 1 is a perspective view illustrating an upper plate and a side wall of a heat-retaining tray according to an exemplary embodiment of the present invention, FIG. 2 is a cross-sectional view illustrating the upper plate and the side wall of the heat-retaining tray according to the exemplary embodiment of the present invention, FIG. 3 is an exploded perspective view illustrating the heat-retaining tray including a lower plate and a second side wall according to the exemplary embodiment of the present invention, FIG. 4 is a state of use diagram illustrating the heat-retaining tray including the lower plate and the second side wall according to the exemplary embodiment of the present invention, FIG. 5 is a state of use diagram illustrating the heat-retaining tray including a support means of a temperature increase unit according to the exemplary embodiment of the present invention, FIG. 6 is a state of use diagram illustrating the heat-retaining tray including an electricity supply means of the temperature increase unit according to the exemplary embodiment of the present invention, FIG. 7 is a cross-sectional view illustrating the heat-retaining tray including the electricity supply means of the temperature increase unit according to the exemplary embodiment of the present invention, FIG. 8 is a schematic diagram illustrating a test apparatus for measuring a temperature distribution of a tray for Examples, FIG. 9 is a graph illustrating a result of measuring a temperature distribution in a ceramic tray in the related art, which is obtained in Example 1, FIG. 10 is a graph illustrating an average temperature deviation between a center and an edge of the ceramic tray in the related art, which is obtained in Example 1, FIG. 11 is a graph illustrating a result of measuring a temperature distribution in a heat-retaining tray according to an exemplary embodiment of the present invention, which is obtained in Example 2, FIG. 12 is a graph illustrating an average temperature deviation between a center and an edge of the heat-retaining tray according to the exemplary embodiment of the present invention, which is obtained in Example 2, and FIG. 13 is a graph illustrating a cumulative moisture removal amount of the heat-retaining tray according to the exemplary embodiment of the present invention, which is obtained in Example 3. Hereinafter, a heat-retaining tray which is the present invention will be described in detail through FIGS. 1 to 13 and Examples.

Referring to FIGS. 1 and 2, an upper plate 10 of a heat-retaining tray 1 of the present invention is formed in a disk shape having a predetermined diameter and a plurality of protrusions 11 is formed with predetermined interspacing on the upper surface of the upper plate 10 where pizza is laid. The protrusions 11 may be formed from the center of the upper plate 10 to an outer end in a radial form. A plurality of valleys 12 is formed inbetween a protrusion 11 and an adjacent protrusion 11 to become a flow passage for moisture.

The shape of the protrusion 11 may be formed in an embossing shape, a straight shape, a wave shape, and the like, and is not particularly limited to the shapes. Further, the height of the protrusion 11 is not largely limited, but it may have a height that's enough for the lower surface of the pizza not to contact the valleys 12 of the upper plate 10.

The side wall 20 is formed downward vertically on the edge of the upper plate 10. The height of the side wall 20 is not largely limited, but may have a height that allows heat that was introduced in an internal space S to be capable of implementing convection current.

The upper plate 10 and the side wall 20 may be made with a metal material or an alloy that has excellent conductivity and is harmless to the human body, such as stainless steel, copper, and aluminum, and anti-corrosion coating may be additionally formed on the surface.

Further, referring to FIG. 2B, a drain hole 21 may be formed in the side wall 20. The drain hole 21 may easily discharge water flowing into the heat-retaining tray 1 in a process of washing the inside or the outer surface of a grill, and particularly, slowly discharge heat stored in the heat-retaining tray 1 to the outside to prevent heat from being excessively accumulated in the internal space S of the heat-retaining tray 1 and always maintain an appropriate temperature.

Further, referring to FIGS. 3 and 4, a lower plate 10' may be further included below the upper plate 10 including the side wall 20. A second side wall 20' is formed upward vertically on the edge of the lower plate 10'. The upper plate 10 including the side wall 20 and the lower plate 10' including the second side wall 20' each have disk shapes with predetermined diameters and may be detachably connected to each other.

Herein, the height of the second side wall 20' is not largely limited, but may have a height that allows heat that was introduced in the internal space S to be capable of implementing convection current while the upper plate 10 and the lower plate 10' are connected to each other.

More particularly, the diameter of the side wall 20 is larger than the diameter of the second side wall 20', and the second side wall 20' may be formed to be inserted into the inner side of the side wall 20. Thus, the lower surface of the upper plate 10 is supported to the second side wall 20' without a separate fastening means and thereby, the upper plate 10 and the lower plate 10' may maintain an interconnected relation.

Of course, the diameter of the side wall 20 may be formed to be equal to the diameter of the second side wall 20', or the diameter of the second side wall 20' may be formed to be larger than the diameter of the side wall 20. In this case, a separate fastening means may be required to maintain a connection between the side wall 20 and the second side wall 20'. For example, by forming a screw for interconnecting the upper plate 10 including the side wall 20 and the lower plate 10' including the second side wall 20', or forming a fastening protrusion or a fastening groove on the inner surface of the side wall 20 and the outer surface of the second side wall 20', respectively, upper plate 10 including the side wall 20 and the lower plate 10' including the second side wall 20' can be fastened to each other.

Further, the lower plate 10' and the second side wall 20' may be made with a metal material or an alloy that has excellent conductivity and is harmless to the human body, such as stainless steel, copper, and aluminum, and anti-corrosion coating may be additionally formed on the surface.

The lower plate 10' is flatly formed and a lower plate heat inlet 22 is formed at the center of the lower plate to allow heat by a heating means 50 to be introduced.

In addition, the temperature increase unit may include at least either a support means 40 or an electricity supply means 60.

More particularly, when the support means 40 is used as the temperature increase unit, referring to FIG. 5, the support means 40 includes a seating platform 41 on which the side wall 20 is seated and a plurality of support legs 42 that are connected to the lower portion of the seating platform 41. A heat inlet 41a is formed at the center of the seating platform 41 so that the heat of the heating means 50 may be introduced into the upper plate.

The heat inlet 41a allows external heat from a separate heating means 50 such as a candle or an alcohol lamp to be transferred to the space S of the upper plate 10 and the side wall 20.

The heat generated from the heating means 50 is stored in the internal space S of the upper plate 10 and the side wall 20 to raise the temperature of the entire container, particularly, the upper plate 10.

The heat transferred through the heat inlet 41a is transferred to the internal space S of the heat-retaining tray 1 by a convection method. Particularly, the heat may be concentrated at the upper side of the heat inlet 41a and the lower surface of the upper plate 10. In this case, excessive heat is locally concentrated on the surface of the upper plate 10 and thus, it may be difficult to uniformly maintain the temperature of the entire food such as pizza, waffle, honey bread, and the like.

Accordingly, a heat diffusion plate 30 is provided on the lower surface of the upper plate 10. The heat diffusion plate 30 consisted of a plate having a predetermined thickness to prevent the heat from being concentrated at the center of the upper plate 10 and works to spread the heat to the entire upper plate 10 evenly. The heat diffusion plate 30 is formed in a circular shape in the exemplary embodiment of the present invention, but the shape thereof is not limited.

The heat diffusion plate 30 is disposed at the center of the lower surface of the upper plate 10 and may be connected to be spaced apart from the upper plate 10 by a predetermined distance through a plurality of spacers 31. Each spacer 31 may be fixed to the upper plate 10 by using welding and the like.

The heat diffusion plate 30 diffuses the heat introduced from the outside through the heat inlet 41a therearound to prevent the heat from being locally concentrated on the inner surface of the upper plate 10. Further, because the heat diffusion plate 30 is spaced apart from the inner surface of the upper plate 10, the excessive rise in temperature of a part of the upper plate 10 can be prevented.

Referring to FIG. 2, a distance d2 between the upper plate 10 and the heat diffusion plate 30 may be smaller than a height d1 of the side wall. For example, when the distance between the upper plate 10 and the heat diffusion plate 30 is larger than the height of the height of the side wall, the heat diffusion plate 30 contacts the support means 40 and a predetermined gap is generated on the side wall 20 and the support means 40 and thus, it is difficult to implement a convection for heat-retaining the pizza.

Food including kneading dough such as pizza, waffle, honey bread, and the like which are cooked in the stove or the oven may be placed on the top of the heat-retaining tray 1, and the lower surface of the pizza, waffle, honey bread, and the like is laid on the protrusions of the upper plate 10 and is spaced apart from the valleys 12 of the upper plate 10.

Referring back to FIG. 5, the heating means 50 is disposed at a position corresponding to the heat inlet 41*a* below the heat-retaining tray 1, and the support means 40 is added on the lower surface of the heat-retaining tray 1 to provide an installation space of the heating means 50.

Accordingly, hot air is accumulated in the internal space S of the heat-retaining tray 1 through the heating means 50 and heat energy is supplied to the pizza through the surface of the heat-retaining tray 1 to maintain the pizza in a hot state for a long time.

The high temperature heat transferred to the upper plate 10 forms a temperature difference and a pressure difference with relatively low-temperature air around the heat-retaining tray 1 and as a result, airflow is generated therearound through the valleys 12 between the protrusions 11. Hence, the flow of the air on the lower surface of the food such as pizza, waffle, honey bread, and the like becomes smooth and moisture contained in the food may be continuously discharged to the outside through the plurality of valleys 12.

As such, through the two actions of air flow and heat transfer, the moisture in the food can be prevented from forming and becoming concentrated on the surface of the food to appropriately maintain the moisture in the food, and thus crispness and chewiness of the food such as pizza, waffle, honey bread, and the like may be simultaneously maintained.

Further, when the support means 40 of the heat-retaining tray 1 is connected, all parts except for the heat inlet 41*a* of the support means 40 are substantially closed to the outside and the heat transferred through the heat inlet 41*a* remains only in the internal space S of the container, and thus rapid heating is possible and a high temperature may be maintained for a long time by less heat, and as a result, there is a benefit of not having a large energy consumption.

In addition, when the electricity supply means 60 is used as the temperature increase unit, referring to FIG. 6, the electricity supply means 60 may provide heat to the upper plate 10 and includes a heat wire 61 disposed on the lower surface of the upper plate 10 and an electricity supply wire 62 applying power to the heat wire 61.

Referring to FIG. 7, the heat wire 61 is disposed on the lower surface of the upper plate 10 so that the heat is evenly spread to the entire upper plate 10, and particularly, the heat wire 61 may be concentrically disposed at a portion which is in contact with the pizza, waffle, honey bread, and the like.

Accordingly, the heat wire 61 may be disposed on the lower surface of each protrusion 11 contacting the food in a length direction of the protrusion. In this case, since the protrusions 11 of the present invention are formed in a radial shape toward the edge from the center of the upper plate, the heat wire 61 is also disposed to correspond to the shape of the protrusion, but can be connected in a zigzag wave form in a region without the protrusions.

Referring to FIG. 6, the electricity supply means 60 may further include a temperature controller 63 capable of controlling the temperature of the upper plate 10. The temperature controller 63 is connected to a part of the electricity supply wire 62 to control the temperature of the heat wire 61, and as a result, the temperatures of the upper plate 10 and the food such as pizza, waffle, honey bread, and the like placed on the upper surface of the upper plate are controlled according to user's taste and preference.

Pizza, waffle, and honey bread which are cooked in the stove or the oven may be placed on the top of the heat-retaining tray 1. In this case, the lower surface of the food is placed to contact the protrusions 11 of the upper plate 10 and be spaced apart from the valleys 12 of the upper plate 10.

When electricity is applied to the heat wire 61 of the electricity supply means 60, heat is transferred to the upper plate 10 and hot air is accumulated in the internal space S formed by the upper plate 10 and the side wall 20, and thus, the food may be maintained in a hot state for a long time by supplying heat energy to the pizza, waffle, and honey bread through the surface of the heat-retaining tray 1.

That is, the heat provided from the electricity supply means 60 directly heats the upper plate 10, whereas the heat is not discharged to the outside, but transferred to the internal space S formed by the upper plate 10 and the side wall 20 by a convection method.

Accordingly, the high temperature heat transferred to the upper plate 10 forms a temperature difference and a pressure difference with relatively low-temperature air around the heat-retaining tray 1 and as a result, airflow is generated therearound through the valleys 12 between the protrusions 11. Hence, the flow of the air on the lower surface of the food such as pizza, waffle, honey bread, and the like becomes smooth and moisture contained in the pizza may be continuously discharged to the outside through the plurality of valleys 12.

As such, through the two actions of air flow and heat transfer, the moisture in the food can be prevented from forming and becoming to appropriately maintain the moisture in the food, and thus crispness and chewy of the food such as pizza, waffle, honey bread, and the like may be simultaneously maintained.

Further, when the electricity supply means 60 of the heat-retaining tray 1 is connected, all parts are substantially closed by the upper plate 10 and the side wall 20, and the heat transferred through the heat wire 61 remains only in the internal space S of the tray, and thus rapid heating is possible and a high temperature may be maintained for a long time by less heat, and as a result, there is a benefit of not having a large energy consumption.

Hereinafter, Examples will be described in detail in order to help in understanding the present invention. However, the following Examples exemplify the contents of the present invention and the scope of the present invention is not limited to the following Examples. Examples of the present invention are provided for more completely explaining the present invention to those skilled in the art.

Example 1

Example 1 for measuring distribution and change in temperature of the tray used in the related art by using pizza was implemented. Herein, generally, if a time for eating the pizza is set to maximum 30 min, the pizza needs to be maintained at a temperature (45±10° C.) suitable for being eaten by a general person during the 30 minutes. To this end, the temperature of the tray must be maintained at 55° C. or more, while the central part is not excessively heated, and a temperature difference between the central part and the edge needs to be maintained within 20° C.

In Example 1, an apparatus for measuring distribution and change in temperature of the tray made of a ceramic material with a diameter of 330 mm and a thickness of 12 mm was prepared. Example 1 is illustrated in FIG. 8 and conditions of Example 1 are illustrated in Table 1.

| | |
|---|---|
| Heat diffusion plate | None |
| Distance between lower surface of tray and candle | 44 mm |
| Candle used in test | Diameter of 38 mm and thickness of 15 mm |
| Wick used in candle | Smokeless No. 1.4 |
| Wick length of candle | 5.0 mm |

As illustrated in FIG. 8, a plurality of sensors was installed in the center of the tray and the edge from the center in order to measure a temperature distribution.

The center (R=0) of the tray was represented as CH1, points 75 mm away from the center of the tray were represented as CH2, CH3, and CH4, and points 150 mm away from the center of the tray were represented as CH5, CH6, CH7, and CH8 and thus temperatures and temperature differences were measured.

As a test result, in the case of the ceramic tray, the temperature of the center CH1 was very high, 161° C. after 30 min and 200° C. after 60 min as illustrated in FIG. 9.

Further, an average temperature deviation between the center and the edge of the ceramic tray was very large, 132.8° C. after 30 min and 165.7° C. after 60 min as illustrated in FIG. 10.

Example 2

Example 2 for measuring a distribution and a change in temperature of a heat-retaining tray including a heat diffusion plate of the present invention was implemented. An apparatus for measuring distribution and change in temperature of a tray made of a stainless steel (SS) material was prepared and conditions of Example 2 are illustrated in Table 2.

| | |
|---|---|
| Heat diffusion plate | Diameter of 300 mm, thickness of 1.0 mm, aluminum material |
| Distance between lower surface of tray and heat diffusion plate | 1.7 mm |
| Distance between heat diffusion plate and candle | 58 mm |
| Candle used in test | Diameter of 38 mm and thickness of 15 mm |
| Wick used in candle | Smokeless No. 1.4 |
| Wick length of candle | 5.0 mm |

With the same method as Example 1 performed above, as illustrated in FIG. 8, a plurality of sensors was installed in the center of the tray and the edge from the center in order to measure a temperature distribution.

The center (R=0) of the tray was represented as CH1, points 75 mm away from the center of the tray were represented as CH2, CH3, and CH4, and points 150 mm away from the center of the tray were represented as CH5, CH6, CH7, and CH8 and thus temperatures and temperature differences were measured.

As a test result, in the case of the heat-retaining tray of the present invention, the temperature of the center CH1 showed an appropriate temperature of 62.3° C. after 30 min and 74.5° C. after 60 min as illustrated in FIG. 11.

Further, an average temperature deviation between the center and the edge of the heat-retaining tray of the present invention was very small, within 10.1° C. after both 30 min and 60 min as illustrated in FIG. 12.

Example 3

In Example 3, a cumulative moisture removal amount of the heat-retaining tray of the present invention was measured. Stove pizza having a diameter of about 300 mm and a weight of 286.49 g was used, and a heat-retaining tray made of a stainless steel material having a diameter of 330 mm was prepared.

Conditions of Example 3 are illustrated in Table 3 below.

| | |
|---|---|
| Heat diffusion plate | Diameter of 300 mm, thickness of 1.0 mm, aluminum material |
| Distance between lower surface of tray and heat diffusion plate | 1.7 mm |
| Distance between heat diffusion plate and candle | 58 mm |
| Candle used in test | Diameter of 38 mm and thickness of 15 mm |
| Wick used in candle | Smokeless No. 1.4 |
| Wick length of candle | 5.0 mm |

As a test result, as illustrated in FIG. 13, it was verified that a cumulative moisture removal amount according to an operation time of the heat-retaining tray was shown as 8.5 g after 30 min and 12.7 g after 60 min and the moisture was effectively removed over time.

As described above, the detailed exemplary embodiments for the heat-retaining tray according to the present invention are described, but it is apparent that various modifications can be implemented without departing from the scope of the present invention.

Therefore, the scope of the present invention should not be limited to the exemplary embodiment and should be defined by the appended claims and equivalents to the appended claims.

That is, it should be understood that the aforementioned exemplary embodiments are described for illustration in all aspects and are not limited, and it should be construed that the scope of the present invention is represented by the claims to be described below other than the detailed description, and all of the changes or modified forms induced from the meaning and the scope of the claims, and an equivalent concept thereof are included in the scope of the present invention.

The invention claimed is:

1. A heat-retaining tray comprising:
   an upper plate having a plurality of protrusions formed such that food is laid on the upper surface of the plurality of protrusions;
   a side wall integrally formed vertically on the periphery of the upper plate;
   a temperature increase unit for raising a temperature of the upper plate; and
   a lower plate and a second side wall integrally formed vertically on the periphery of the lower plate below the upper plate and the side wall,
   wherein the temperature increase unit comprises at least one of a support means and an electricity supply means which comprises a heat wire,
   the support means comprises a seating platform on which the second side wall is seated and in which a through-hole is formed and a plurality of support legs which are connected to a lower portion of the seating platform, a heat diffusion plate is provided below the upper plate at a position corresponding to the through-hole, and the heat diffusion plate is spaced apart from and connected to a lower portion of the upper plate by a spacer.

2. The heat-retaining tray of claim 1, wherein each of the plurality of protrusions are formed in a radial form from the center of the upper plate.

3. The heat-retaining tray of claim 1, wherein a drain hole is further included in the side wall.

4. The heat-retaining tray of claim 1, wherein the heat wire disposed on a lower surface of the upper plate, and the electricity supply means further comprises an electricity supply wire supplying an electricity to the heat wire.

5. The heat-retaining tray of claim 4, wherein the heat wire is disposed in a zigzag form to correspond to each protrusion.

6. The heat-retaining tray of claim 5, wherein the electricity supply means further comprises a temperature controller capable of controlling a temperature of the heat wire.

7. The heat-retaining tray of claim 4, wherein the electricity supply means further comprises a temperature controller capable of controlling a temperature of the heat wire.

8. The heat-retaining tray of claim 1, wherein a moisture of the food is removed by a plurality of valleys which are flow passages of the moisture formed between the plurality of protrusions.

9. A heat-retaining tray comprising:

an upper plate having a plurality of protrusions formed such that food is laid on the upper surface of the plurality of protrusions;

a side wall integrally formed vertically on the periphery of the upper plate;

a temperature increase unit for raising a temperature of the upper plate, and a lower plate, and a second side wall integrally formed vertically on the periphery of the lower plate below the upper plate and the side wall, wherein the temperature increase unit comprises at least one of a support means and an electricity supply means, the support means comprises a seating platform on which the second side wall is seated and in which a through-hole is formed and a plurality of support legs which are connected to a lower portion of the seating platform, the electricity supply means comprises a heat wire, a heat diffusion plate is provided below the upper plate at a position corresponding to the through-hole, and a distance between the upper plate and the heat diffusion plate is smaller than a height of the side wall.

10. The heat-retaining tray of claim 9, wherein the heat wire is disposed on a lower surface of the upper plate, and the electricity supply means further comprises an electricity supply wire supplying an electricity to the heat wire.

11. The heat-retaining tray of claim 10, wherein the heat wire is disposed in a zigzag form to correspond to each protrusion.

12. The heat-retaining tray of claim 10, wherein the electricity supply means further comprises a temperature controller capable of controlling a temperature of the heat wire.

13. The heat-retaining tray of claim 9, wherein a moisture of the food is removed by a plurality of valleys which are flow passages of the moisture formed between the plurality of protrusions.

14. The heat-retaining tray of claim 9, wherein each of the plurality of protrusions are formed in a radial form from the center of the upper plate.

15. The heat-retaining tray of claim 9, wherein a drain hole is further included in the side wall.

* * * * *